April 30, 1968     G. C. MEIBUHR     3,380,766

SCREW THREAD INSERT

Filed Aug. 25, 1965     3 Sheets-Sheet 1

INVENTOR.
GEORGE C. MEIBUHR
BY
Woodling Krost Granger & Rust
attys.

April 30, 1968   G. C. MEIBUHR   3,380,766
SCREW THREAD INSERT
Filed Aug. 25, 1965   3 Sheets-Sheet 2
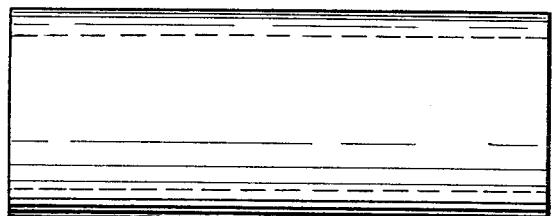
FIG. 6
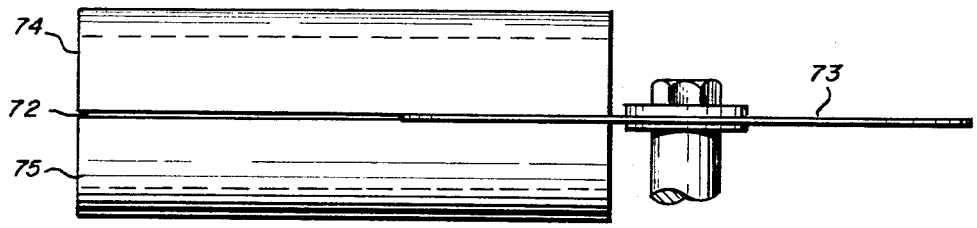
FIG. 7
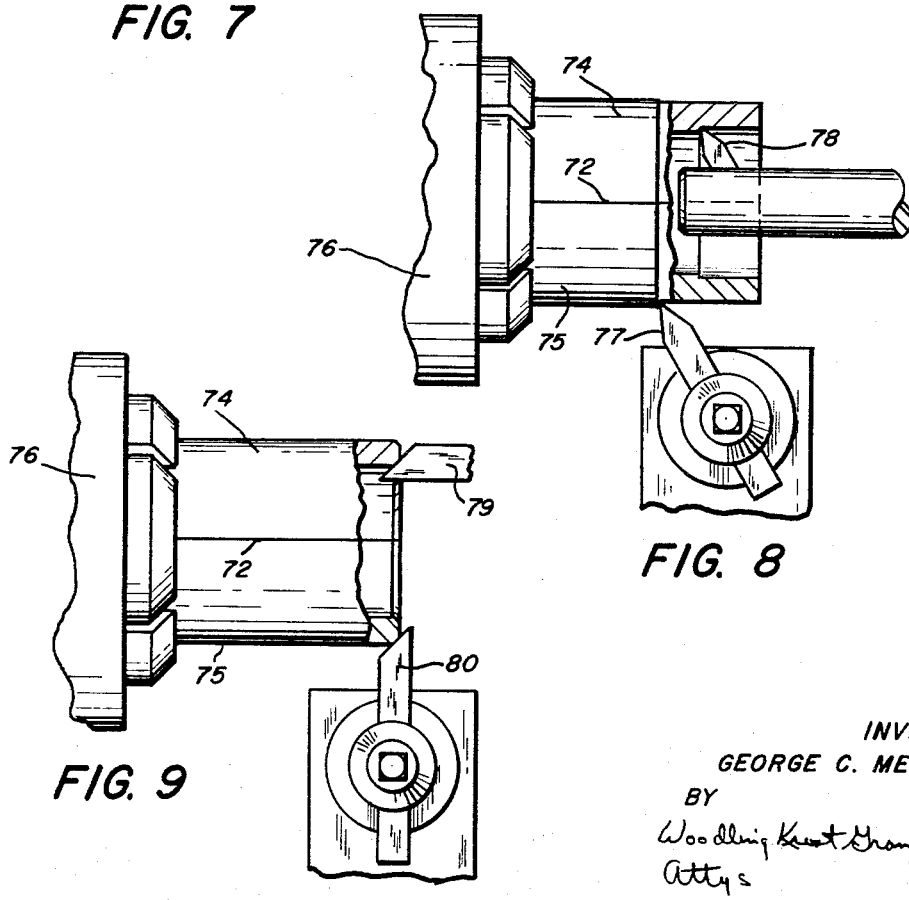
FIG. 8
FIG. 9
INVENTOR.
GEORGE C. MEIBUHR
BY
Woodling Krost Granger + Rust
Atty s April 30, 1968   G. C. MEIBUHR   3,380,766
SCREW THREAD INSERT
Filed Aug. 25, 1965   3 Sheets-Sheet 3

INVENTOR.
GEORGE C. MEIBUHR
BY
Woodling, Krost, Granger & Rust
Attys.

United States Patent Office 3,380,766
Patented Apr. 30, 1968

3,380,766
SCREW THREAD INSERT
George C. Meibuhr, 8325 Midland Road,
Mentor, Ohio 44060
Filed Aug. 25, 1965, Ser. No. 482,371
2 Claims. (Cl. 287—52.03)

ABSTRACT OF THE DISCLOSURE

A readily removable thread on a shaft which comprises a circumferential groove on the shaft and first and second semi-circular members positioned in the groove with their ends abutting each other and having continuous screw threads on their outer surfaces. Means are provided to hold the members in the groove and render them readily removable which may include a slot in the shaft which is engaged by a key which in turn is attached to at least one of the members. A lock washer has extensions which engage a slot in one of the members and a female threaded nut which nut threadably resides on the screw threads of the semi-circular members.

In summary, the present invention provides a readily applied and disassembled screw thread for the surface of a shaft and the invention involves the abutting of the ends of the threaded insert members so that the threads do not have a space or gap at any point. In prior devices gaps between the ends resulted in constructions whereby the members had to be bolted or otherwise semi-permanently fixed in place so that the threads would match.

The present invention relates in general to threaded inserts, and more particularly to constructions which provide an external screw thread on a shaft or other mechanical member.

The object of the present invention is to provide an accurate and reliable means of providing a screw thread on a shaft without threading or turning the integral shaft itself.

Another object of the present invention is to provide a screw thread of relatively low hardness to a hardened shaft to eliminate the possibility of breakage which is present when a shaft is fully hardened in the threaded area; and further to eliminate the difficulties in heat treatments which are required to produce a soft thread on a hardened shaft.

Another object of the present invention is to provide a thread of a material different from that of the parent member, as in the case of a steel thread on an aluminum or cast iron member.

Another object of the present invention is to provide a thread on a member which is fabricated of materials which are of such a nature that screw threads would be difficult to form integrally.

Another object of the present invention is to provide a screw thread on members which are difficult to thread because of their configuration.

Another object of the present invention is to provide a means of applying a thread to a shaft without reducing the diameter behind the thread to a size smaller than the root diameter of the thread of the mating nut, as would be required with an integral thread.

Another object of the present invention is to provide a means of replacing a worn out thread on a shaft with a new thread of like size or of a completely different size or type.

Other objects and a fuller understanding of this invention may be had be referring to the following description and claims, taken in conjunction with the accompanying drawings, in which:

FIGURES 6 through 11 illustrate the steps utilized in constructing the screw thread insert which is shown in FIGURES 1 through 3 which steps will be described in greater detail hereinafter.

As mentioned hereinabove, the present invention has to do with a convenient and economical means of providing a screw thread on a shaft or other member without detracting from the accuracy or utility of the integral thread and while retaining all of the essential features of an integral screw thread. This construction offers several advantages not available with a conventional integral screw thread, such as ease of replacement, variation in material from that of the parent member, improvement in shaft strength by eliminating the area of stress concentration at the root of the thread, improvement in shaft strength by an increase in diameter of the shaft behind the screw thread, and improvement in shaft strength by permitting a wider latitude in selection of materials for the shaft, and other features hereinafter described in detail.

Figure 1:
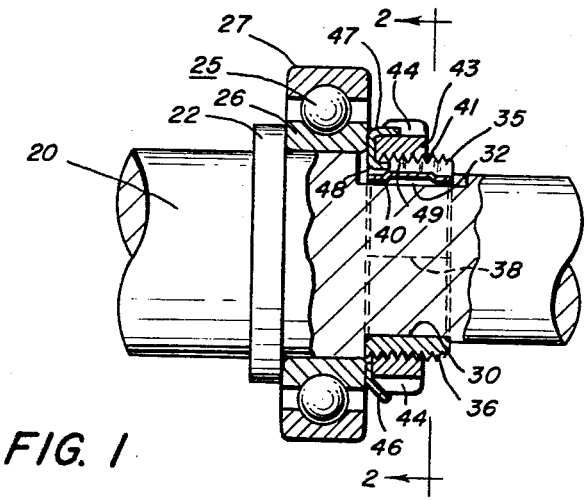
FIGURE 1 is a side elevational view of the screw thread insert of the present invention as utilized in holding a roller bearing on a rotatable shaft.
Figure 3:
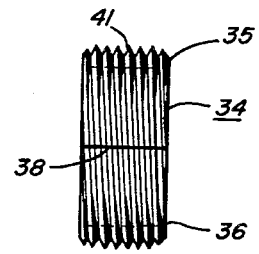
FIGURE 3 is an elevational view of the two parts of the screw thread insert disassembled from the shaft shown in FIGURE 1.
Figure 2:
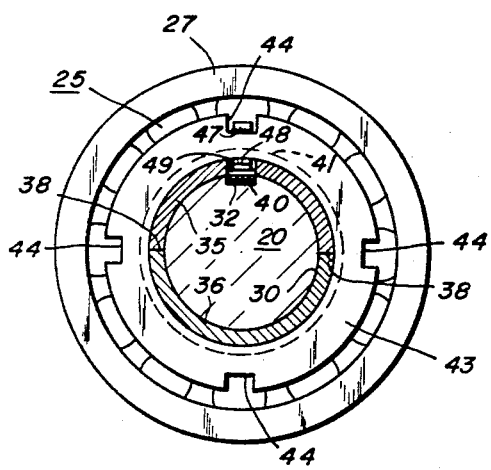
FIGURE 2 is a view taken generally along the line 2—2 of FIGURE 1.

FIGURES 1, 2 and 3 illustrate the screw thread insert of the present invention in one environment, namely, that of accomplishing its function of aiding in the holding of a roller bearing 25 in position against a shoulder 22 formed integrally upon a rotatable shaft 20. As noted, the bearing comprises an inner race 26 and an outer race 27 which parts perform their normal and intended function.

A circumferentially extending groove 30 is provided in the surface of the shaft 20 at a position just axially outwardly of one end of the bearing 25 and there is also provided a keyway 32 at one position in the groove 30 for a purpose which will be described hereinafter. The screw thread insert of the present invention is indicated by the reference numeral 34 and is best seen in FIGURE 3, and this insert comprises a first semi-circular insert member 35 and a second semi-circular insert member 36, each of which resides in the circumferentially extending groove 30 with the sides thereof generally abutting the sides of the groove as best seen in FIGURE 1 and the circumferential ends of the two insert members 35 and 36 abut each other as at 38. An inner portion of the first semi-circular insert member 35 is deformed so as to form a key 40 which resides in the keyway 32 in the normal use of the screw thread insert and prevents the assembled screw thread insert from rotatably moving in the circumferential groove 30. The insert members 35 and 36 have a continuous screw thread 41 formed on their outer surfaces which is perfectly matched at the juncture of the abutting ends 38 and the construction will be more thoroughly understood from a review of the method of making the screw thread which will be described in more detail hereinafter.

A conventional lock washer 46 has been shown which engages the inner race 26 of the bearing and which has an extension 47 which resides in a given slot 44 in a conventional lock nut 43 which in turn threadably resides on the screw threads 41 of the screw thread insert 34. Lock washer 46 has another extension 48 which resides in a slot 49 in the screw thread insert and this construction maintains the lock washer 46 and insert 34 in the proper angular position relative to each other.

Figure 4:
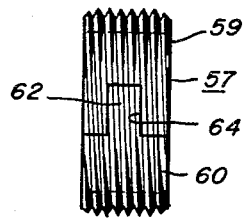
FIGURE 4 is an elevational view of a modified form of the screw thread insert of the present invention.
Figure 5:
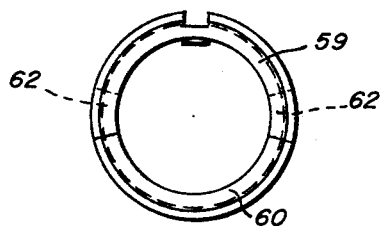
FIGURE 5 is an end view of the screw thread insert shown in FIGURE 4.
Figure 10:
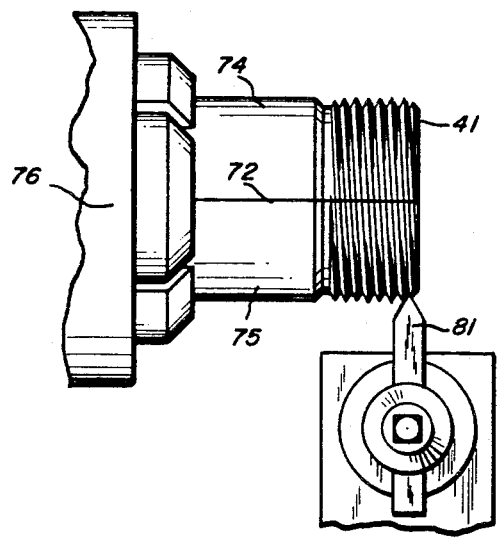
Figure 11:
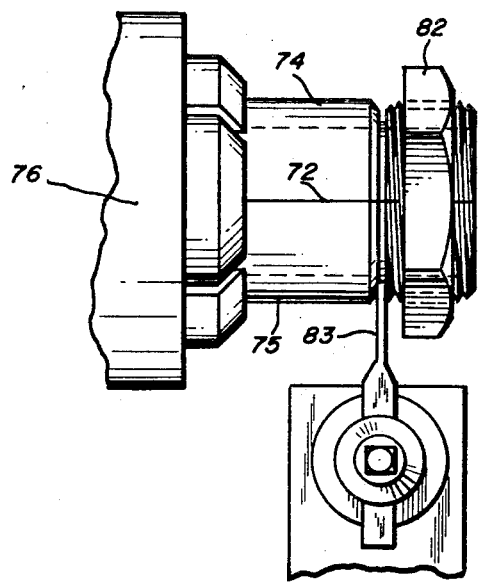

FIGURES 4 and 5 illustrate a slight modification of the screw thread insert shown in FIGURES 1 through 3. In this embodiment the modified form of the screw thread insert has been identified by the reference numeral 57 and this embodiment includes first and second semi-circular insert members 59 and 60 respectively. This embodiment has been shown to demonstrate a construction which when assembled will remain in the groove on the shaft in the position in which it normally resides when, for example, the lock nut 43 shown in FIGURE 1 would be removed from the insert. It will be noted in the embodiment of FIGURES 1, 2 and 3 that the two parts of the insert are held together by the lock nut. In this embodiment two slots 64 are provided in the first semi-circular insert member 59 and two fingers 62 are formed in the second semi-circular insert member 60. In this manner when the fingers 62 are inserted in the slots 64 the interlocking portions which both extend over center and are extending in a circumferential direction, serve to hold the two parts together. The deformation of the parts of the insert members which extend over center are designed to remain within the elastic limit of the material from which the members are constructed to insure circularity of the insert after assembly.

FIGURES 6 through 11 demonstrate the method of making the screw thread insert shown in FIGURES 1 through 3 and to this extent there is provided a cylindrical member 69 shown in FIGURE 6. This cylindrical member might originate from any of many sources, for example might be constructed from an axial length of steel tubing. The next step in the process of constructing the screw thread insert is shown in FIGURE 7 where a tool 73 is shown making an axial cut 72 to sever the cylindrical member into first and second annular members 74 and 75. This provides the two annular parts which are to make up the finished screw thread insert 34 shown in FIGURES 1 through 3. It will be appreciated after the tool 73 has severed the cylindrical member in an axial direction by means of the cut 72, that when the two pieces are again put together along the cut line 72, the resulting configuration is not circular but approaches an elliptical configuration. Since it is necessary to provide a circular configuration, it is necessary to finish the inside and outside diameter of the resulting configuration. To accomplish this result, the two parts are held in a chuck 76 shown in FIGURE 8 and tools 77 and 78 serve to finish the outside and inside diameter to bring the configuration back into circularity. If desired, tools 79 and 80 shown in FIGURE 9 may provide the desired chamfer on the inner and outer edges of the two members 74 and 75.

After this has been accomplished, screw threads 41 are machined on the outer surface of the annular members 74 and 75 by means of a tool identified by the reference numeral 81 and after the threads have been provided the two matched threaded members 74 and 75 are held together by means of a nut 82 (FIGURE 11) and the finished insert is removed from the remaining unfinished stock by means of a cut off tool 83. In this manner it is possible to provide the screw thread insert of the present invention and provide threads on the two parts which are perfectly matched to accomplish the intended function which has been set forth hereinabove.

Although the assembly shown in FIGURES 1 through 3 illustrates the use of the screw thread insert 34 of the present invention in conjunction with a ball bearing, it will be appreciated by those skilled in the art that it may be used to retain the assembly of any common shaft-mounted member such as a cam, gear, roller bearing, or lever. The standard bearing lock washer and nut are shown for illustrative purposes since the screw thread insert will work equally well with other types of nuts and locking arrangements. It should also be appreciated that the screw thread insert has been shown as comprised of two semi-circular members, each of which occupies substantially 180° of circumferential extent. However, it should be appreciated that the insert might include three parts of which extends 120° or a corresponding number of additional parts with a correspondingly smaller circumferential extent. It will also be apparent that one may use a tapered or conical groove in the shaft for use with a screw thread insert with like inner configuration. Inasmuch as many screw thread applications are required to resist thrust in one direction only, the incorporation of a conical groove with a perpendicular face arranged to oppose the thrust offers a more uniform change in cross section of the shaft.

It will thus be appreciated that the present invention provides a reliable means of putting a screw thread on a shaft without integrally threading the shaft itself. As a result the physical characteristics of the thread may be tailormade to suit the particular problem at hand without regard to the material of construction of the shaft. The present invention provides a convenient means of replacing worn out threads on a shaft with a new thread and also provides a means of threading a member which might be normally difficult because of its configuration.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A shaft and thread combination including wall means on the surface of said shaft providing a circumferential groove, first and second semi-circular members each having inner and outer surfaces, said inner surface of each of said first and second semi-circular members engaging the wall means of said groove and located therein with the ends of said first and second semi-circular members abutting each other, wall means on said outer surface of said first and second semi-circular members providing continuous screw threads, a slot intersecting said circumferential groove and extending generally transversely thereto and intersecting both side walls of said groove, and a key connected at one portion to one of said semi-circular members and having another portion located in said slot to prevent rotation of said semi-circular members in said circumferential groove.

2. A shaft and thread combination including wall means on the surface of said shaft defining a circumferential groove, first and second semi-circular members each having inner and outer surfaces, said inner surface of each of said first and second semi-circular members engaging the wall means of said groove with the ends of said first and second semicircular members abutting each other, wall means on said outer surface of said first and second semi-circular members defining continuous screw threads, wall means defining a slot intersecting said circumferential groove and extending generally transverse thereto, a key connected at one portion to one of said semi-circular members and having another portion located in said slot to prevent rotation of said semi-circular members in said circumferential groove, an axially extending slot on the outer surface of one of said semi-circular members, a lock washer having outer and inner extension means, said inner extension means residing in said axially extending slot, a female screw threaded nut member threadably residing on said screw threads of said first and second semi-circular member and also having an axially extending slot on the outer surface thereof, and said outer extension means residing in said axially extending slot of said nut member.

References Cited

UNITED STATES PATENTS

| | | | |
|---|---|---|---|
| 370,168 | 9/1887 | Truxal | 85—33 XR |
| 628,747 | 7/1899 | Bokel. | |
| 955,902 | 4/1910 | Rand. | |
| 1,083,463 | 1/1914 | Prejean. | |
| 1,654,235 | 12/1927 | Biggert. | |
| 2,887,891 | 5/1959 | Perez | 151—53 XR |

CARL W. TOMLIN, *Primary Examiner.*

A. V. KUNDRAT, *Assistant Examiner.*